Nov. 12, 1935.   G. L. NEELY ET AL   2,020,565
FRICTION TESTING MACHINE
Filed May 20, 1932   3 Sheets-Sheet 2

INVENTORS
George L. Neely
Eldred E. Edwards
By J. H. Adams
ATTORNEY

Nov. 12, 1935.  G. L. NEELY ET AL  2,020,565
FRICTION TESTING MACHINE
Filed May 20, 1932    3 Sheets-Sheet 3

INVENTORS
George L. Neely
Eldred E. Edwards
By  /s/ _____
ATTORNEY

Patented Nov. 12, 1935

2,020,565

UNITED STATES PATENT OFFICE 2,020,565

FRICTION TESTING MACHINE

George L. Neely, Berkeley, and Eldred E. Edwards, Oakland, Calif., assignors to Standard Oil Company of California, San Francisco, Calif., a corporation of Delaware Application May 20, 1932, Serial No. 612,464

13 Claims. (Cl. 265—10)

This invention relates to a friction testing machine and particularly to one which is adapted to test the "oiliness" or friction reducing properties of a lubricant in a manner that avoids consideration of the effect of the viscosity of the lubricant.

It is a well known fact that there are two forms of lubrication, namely, fluid film and absorbed film. In fluid film lubrication the viscosity of the lubricant is the controlling, if not the sole factor in the frictional force between the relatively moving surfaces. In partial or absorbed films, sometimes called "boundary lubrication" the so-called oiliness property of the lubricant, rather than its viscosity, controls the frictional values obtained. In the latter case the respective metals in contact also influence the frictional resistance.

Early types of friction testing machines embodied a rotating shaft and a journal bearing surrounding it with variable loads placed thereon. The torque necessary to turn the shaft relatively to the bearing under various loading conditions was determined by some form of dynamometer. For the determination of oiliness, these machines were open to the serious objection that the viscosity of the lubricant had a considerable effect upon the friction between the moving and stationary parts, due to the inherent wedging action which takes place in such a bearing or whenever one lubricated surface moves relatively to another and is inclined at an angle thereto. In a journal bearing testing machine, during attempts to measure the oiliness characteristics of lubricants, which require metal-to-metal contact of the friction surfaces, the results obtained include the frictional effects within the converging lubricant film due to its viscosity. Wear of the shaft and bearing during a series of tests also alters the shapes and smoothness of the rubbing surfaces and consequently prevents subsequent duplication of test results. Some journal-type friction machines have been provided with means for oscillating the bearing so as to give it end-motion along the journal, thus providing a lapping effect which tends to keep the contacting surfaces at a uniform degree of smoothness. This lapping motion, although beneficial in smoothing the rubbing surfaces, does not preserve their relative shapes.

In order to test the oiliness characteristics of a lubricant independently of its viscosity, machines such as the well known Deeley absorbed-film friction testing machine were developed. These were similar in appearance to the present invention but operated in a radically different manner. In their design a number of pins were placed on end against a surface flooded with oil. In some cases this surface was made the top of a disc or wheel which was slowly rotated at a uniform speed. The pins were mounted upon the lower surface of a frame or spider which was pivoted to rotate or rather oscillate about its axis under the restraining action of a long spiral spring. Weights were mounted on this frame and urged the friction members against the rotating surface.

The action of this machine was intermittent, that is, the loaded friction pins would adhere or bind to the lower moving surface and be carried around with it until the tension of the spring was great enough to overcome the static friction. The pins then slipped around until equilibrium was established whereupon they again locked with the moving plate and repeated the same cycle. The amount of turning or winding up of the spring was measured on a circular scale at the top of the instrument. These devices, in addition to being only capable of accurately measuring static friction, or of kinetic friction at very low rubbing speeds, were very susceptible to vibration, which affected the frictional force under which the pins would start to slip on the disc. For this reason their results were very erratic. Furthermore, this cycle of binding and slipping of the pins tended to wear grooves in the disc which interfered with subsequent friction determinations.

Other types of testing instruments measured friction between flat contacting surfaces, one of which was made with a flat annular disc which rotated beneath and opposed a second flat annular disc, the axis of the latter being slightly displaced horizontally from that of the former. The upper disc was restrained in its displaced position by a loaded shaft or spindle with a rounded end seating in a depression in the disc. This construction allowed enough sway to correct irregularity of motion caused by imperfection of construction or wear of the lower disc. Viscosity effects, however, were not eliminated in this machine.

It is an object of this invention to provide a friction testing machine in which the kinetic friction between relatively moving surfaces is determined for a given lubricant independently of the effect of the viscosity of the lubricant, said determination being accomplished without attendant change in the shape and degree of smoothness of the frictional surfaces.

It is an object of this invention to provide a friction testing machine in which the kinetic friction between relatively moving surfaces is determined for a given lubricant independently of the effect of the viscosity of said lubricant, and at practically any load or rubbing speed.

Another object of this invention is to provide an apparatus of this type in which the normal operation tends to smooth and polish the rubbing surfaces by their relative motion, at the same time preserving and continuing their relative shapes unaffected by any wear that may occur.

Another object is to provide a machine on which either kinetic friction at various speeds or static friction determinations can be performed.

Another object of this invention is to provide a friction testing apparatus involving a lapping action of the frictional surfaces to obtain a smooth and non-oscillatory indication of the kinetic friction between said surfaces.

Another object of this invention is to provide a friction testing apparatus in which the accuracy of indication is independent of vibration effects.

A further object of this invention is to provide a friction testing machine in which the frictional effect is independent of the quantity of lubricant present on the rubbing surfaces.

Another object is to provide a friction testing machine in which the loading of the friction surfaces is readily adjustable through a wide range.

Yet another object is to provide a friction testing machine in which the temperature of the lubricant and of the rubbing surfaces may be accurately controlled and measured.

Another object is to provide an apparatus of this type which is economical to construct and which is adapted to make a large number of accurately reproducible friction determinations in a given time.

Another object of this invention is to provide a friction testing machine in which the nature of the wear of the friction surfaces may be accurately and readily determined by microscopic examination, and the amount of such wear by measurement of loss of weight.

These and other objects and advantages of this invention will become apparent from the following detailed description of preferred embodiments of this invention and their manner of operation, it being understood that the invention is not limited to the arrangements specifically described.

In these drawings, Figure 1 represents a vertical part sectional view of the preferred embodiment of this invention.

Figure 1:
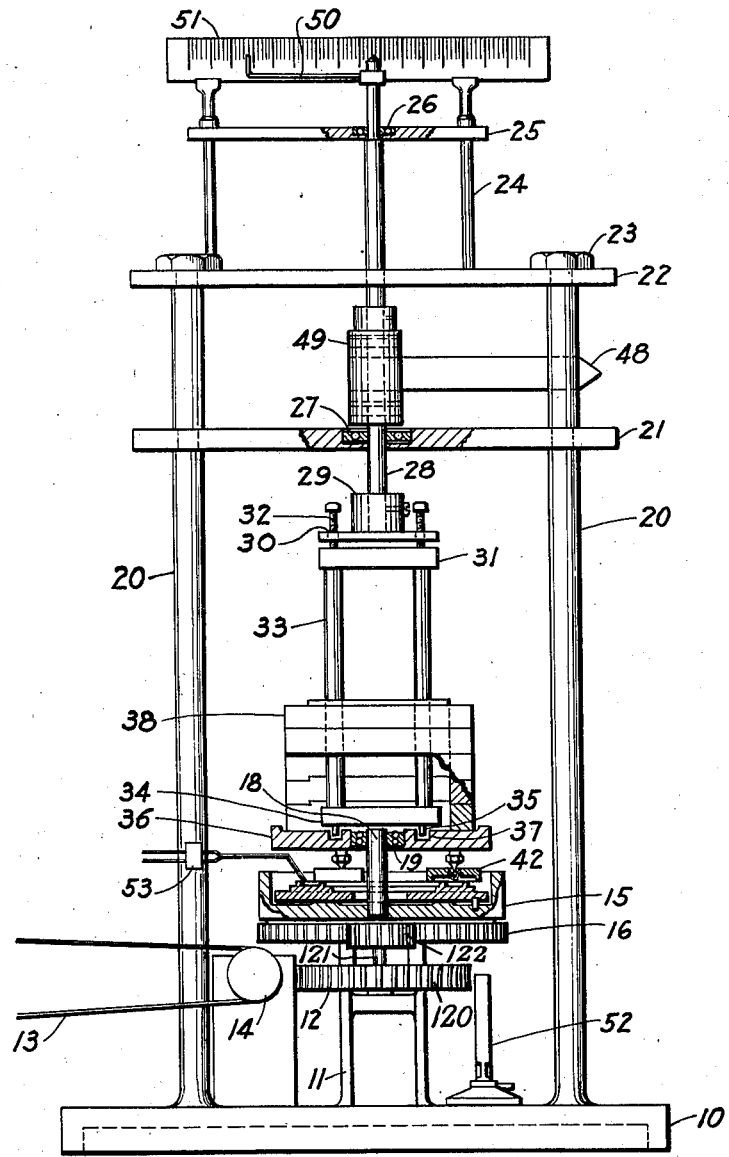
Figure 3:
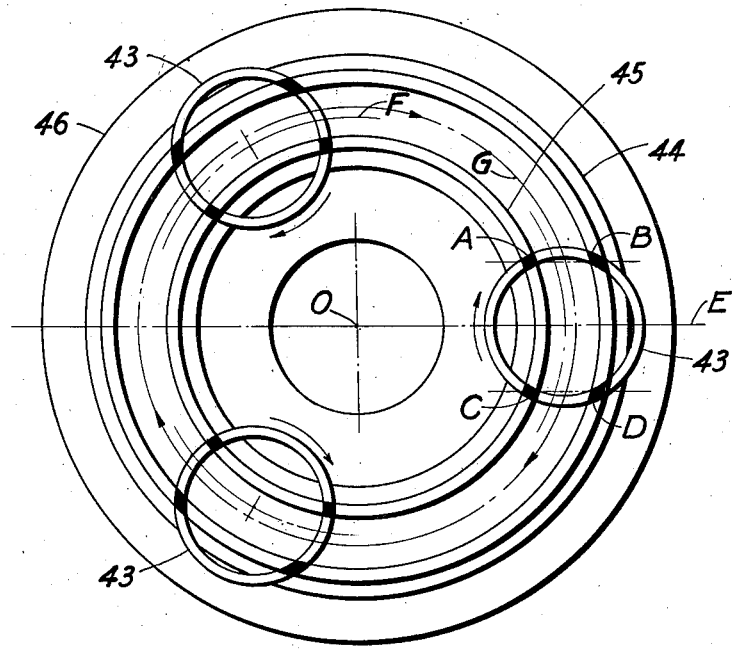
Figure 3 is a horizontal section on line III—III of Figure 2 and shows the relation between the centers of the friction buttons, the tracks, and the friction disc.
Figure 2:
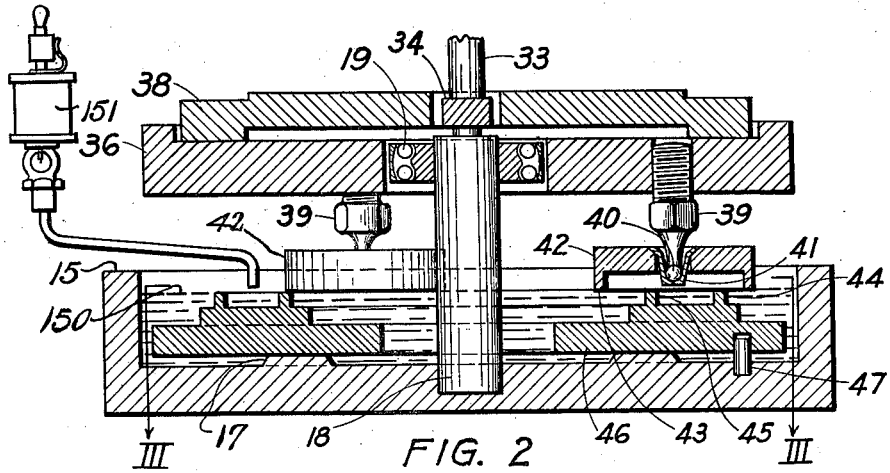
Figure 2 is an enlarged central vertical sectional detail showing the friction buttons and the tracks upon which they rub and rotate, together with a means for supplying lubricant thereto.

Referring to Figures 1, 2 and 3, the numeral 10 represents a suitable base for the apparatus upon which is mounted a support 11 for the reduction gears generally designated as 12. These gears are positively driven by means of a driving belt 13 passing over a pulley 14 and driven from a motor or other suitable source of power (not shown). Pulley 14 is mounted on the shaft of a worm (not shown) which drives a worm gear 120 on the vertical stub shaft 121 journalled in an offset of support 11. At the upper end of stub shaft 121 is a spur gear 122 which meshes with and drives gear 16.

A shallow cup-shaped member 15 is mounted upon the final gear 16 of the train 12 on the center line of the apparatus. This cup-shaped member is provided with an internal annular flange 17 accurately machined to a flat surface and is also fitted with a central pin or spindle 18. At the top of spindle 18 is a self-aligning ball bearing 19.

Three supporting columns or legs 20 extend upwardly from the base 10 and are provided near their upper end with a bearing plate 21. A second plate 22 is mounted at their extreme upper ends, and is held in place by nuts 23. Mounted on plate 22 are legs 24 which support a plate 25 in which the indicator bearing, preferably a radial self-aligning ball bearing 26, is mounted.

Plate 21 is provided in its center with a ball thrust bearing 27 which supports shaft 28. A flanged collar 29 is mounted at the lower end of shaft 28 and is provided with two holes 30, diametrically opposite and in the flange of the collar. A spider or frame 31 is attached to the collar 29 by means of two screws 32 which pass through holes 30 and are free to slide longitudinally therein. Spider 31 is provided with two vertical members 33 disposed as shown in Figure 1. At their lower ends a cross-member 34 is mounted, which cross-member is provided with two downwardly extending pins 35.

Mounted on spindle 18 and guided by a self-aligning ball bearing 19 is a flat circular plate 36, which is free to slide longitudinally upon the outside of bearing 19. Recesses 37 are provided in the upper surface of plate 36 to receive the pins 35 in cross-member 34 at the lower end of spider 31 for a purpose which will be explained below. Member 36 is adapted to receive a number of flat disc weights 38 which are slotted to pass over the members 33 of the spider 31, and which are used to obtain various loading pressures between the friction surfaces.

In the lower face of member 36 and located 120° apart on a circle are three pivot pins 39 which are threaded into holes in member 36 and which terminate at their lower ends in accurately ground hemispherical recesses. The lower ends of these pins rest upon single ball bearings 40 which are in turn located in bearing cups 41 in the centers of friction buttons 42 as shown. The three point construction disclosed provides uniform loading on each friction button.

The friction buttons 42 may be made of any suitable metal or alloy with which the oil to be tested is to be used. They are recessed as shown to provide narrow annular faces or flanges 43 on their lower sides. These faces are preferably accurately finished with sharp edges by grinding or lapping. It is desirable that the center of ball bearing 40 be at the level of the face 43 of the friction buttons to insure against canting or tipping at high loading pressures and rubbing speeds, although this is not absolutely necessary.

Friction buttons 42 are supported upon two narrow annular tracks 44 and 45 which may also be accurately formed with sharp edges and flat tops on the upper face of a circular friction member or plate 46. Plate 46 may be of any suitable metal or alloy, and rests upon the annular flange 17 of the cup-shaped member 15 previously mentioned. It is restrained from turning relatively to 15 by a plurality of pins 47 which are fixed into member 15 and extend into corresponding holes in member 46.

The relationship between the mean radius of tracks 44 and 45, and that of the circle on which lie the centers of pivot pins 39 is very important for best results from this machine, and is illustrated in Figure 3. In order that the wear and loading may be equal on the four shaded areas of contact A, B, C, and D, between the face 43 of friction button 42 and the tracks 44 and 45 on friction plate 46, it is preferable that these areas be substantially equal in extent. In order to fulfill this condition the radii of the various circles shown in Figure 3 may be laid out by following the procedure outlined below.

The radii of tracks 44 and 45 are first chosen as well as that of friction button 42. Obviously, the radii chosen for the tracks and buttons should preferably provide that the contacting areas be well separated in order to facilitate a proper rotation of the buttons. The center of pin 39 (which is also that of friction button 42) is graphically laid out so that lines A—B and C—D which connect the centers of the two corresponding pairs of contact faces are parallel to a radius O—E drawn through the center of the friction button. By this cut-and-try method, which is much simpler to perform and to understand than a complete mathematical solution, the radius of circle F on which lie the centers of pins 39 is determined. Due to the difference in radius of tracks 44 and 45 and to the different angles of intersection between the periphery of the button and the tracks with the consequent different shapes of areas A and B or C and D, it is necessary to make the inside track 45 slightly wider than the outside track 44 in order that areas A, B, C, and D, will be substantially equal. If these areas are considered to be rhomboids bounded by straight lines and if the width of the inner track is made so that the areas of these rhomboids are approximately equal, the required degree of accuracy will be attained. If desired, the exact centers of gravity of these areas of contact and their correct location as described briefly above may be determined by well known mathematical methods.

If the construction outlined above is followed, the contact surfaces will be of substantially equal area and will be equally loaded, consequently, in operation, there will be no tendency for tipping or tilting of the friction buttons 42 with respect to the tracks 44 and 45, and no wedging of the oil film therebetween with its attendant viscosity effects. Furthermore, the wear and frictional effect on each button will be substantially uniform.

It will be noted that the center of pivot pin 39 and consequently the center of friction button 42 is located on circle F. The mean circle of tracks 44 and 45 is represented by the circle G, which, by the construction just outlined, will be found to lie outside of circle F. In consequence, as the tracks 44 and 45 rotate about their common center O under friction buttons 42, the friction buttons themselves will be caused to rotate about their ball bearing pivot pins 39 as indicated by the arrows, due to the unbalanced moment arm relations of their points or areas of contact. This rotating action is of great importance, as it presents a fresh area of contact of the friction surfaces, keeps them constantly wetted with fresh lubricant, maintains them in a smooth and unscored condition by their lapping and prevents their uneven wear. This provides smooth operation of the indicating apparatus, permits a ready determination of frictional values, and insures that the top faces of tracks 44 and 45, as well as the annular face 43 of friction buttons 42, will have sharp and true edges under all conditions of operation. Thus the wedging effect of a pair of inclined surfaces is avoided, and the effects of viscosity of the lubricant on the friction force between the relatively moving parts is eliminated.

In operation, the reducing gear train 12 is rotated by a driving motor (not shown) and, in turn, rotates gear 16, cup 15 and friction member 46. The friction buttons 42 are urged downward equally under the weight of spider 31 and weights 38, and are also rotated about their own centers or pivot pins 39 as explained above. No weight is taken by the shaft 28 because of the freely sliding screws 32 in the holes 30. The frictional drag of the rotating buttons 42 on the tracks 44 and 45 is transmitted upward through the spider 31 and shaft 28 and is opposed by a flat leaf spring 48 which is mounted in a slotted sleeve 49 on shaft 28. The outer end of spring 48 bears against one member 20 of the frame of the machine. The deflection of the spring caused by the frictional drag mentioned is indicated by a pointer 50 which moves over a suitable curved scale 51. The form of spring or opposing force is optional.

The lubricant 150 to be tested is poured into the cup-shaped member 15 preferably to a depth where it will just wet the upper surfaces of tracks 44 and 45. A drip feed oiler 151, (Figure 2) may be used to continuously supply lubricant and maintain its level at the top of tracks 44 and 45. A meniscus, due to capillary attraction, will generally be formed below the lower edges 43 of the friction buttons 42 and the lubricant surface, which will cause the friction surfaces to be constantly supplied with lubricant. A gas heater or burner 52 may be provided to play against the cup 15 as shown, if the temperature of the lubricant and of the friction surfaces is to be increased over that of the atmosphere.

A thermocouple 53 may be mounted on one of the supports 20 as indicated to dip into the lubricant between the tracks 44 and 45 so that an accurate determination of this temperature may be obtained by means of the usual indicating or recording instruments (not shown).

Figure 4:
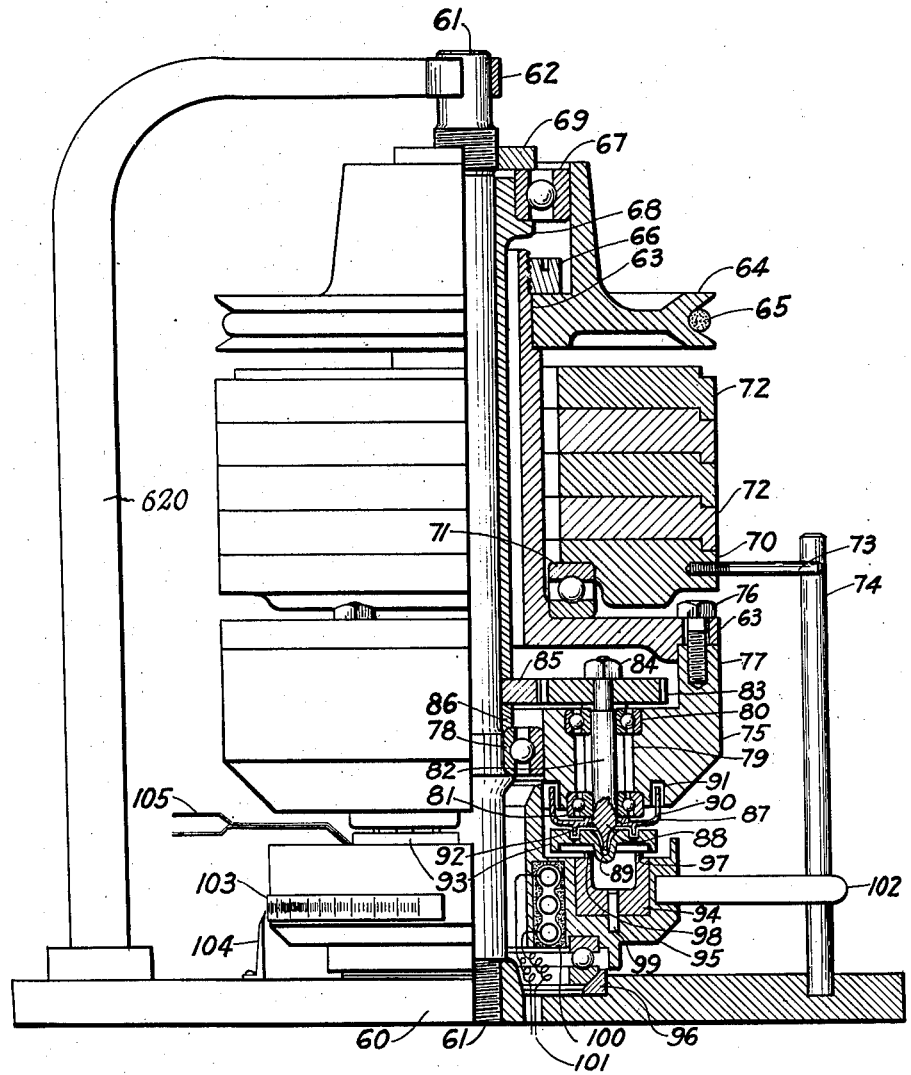
Figure 4 represents a vertical part sectional view of an alternative form of this invention.

Figure 4 shows an alternative form of a friction testing machine in which the friction buttons are positively driven about their own and a central axis, and their combined turning and rubbing effect on a stationary track is used to give an indication of the kinetic friction.

In these drawings the numeral 60 represents a suitable base, which may be a steel plate. In the center of this base and fastened in it by means of screw threads is a central vertical stationary shaft or spindle 61 which extends upward to the top of the apparatus. If desired, a steady rest or bearing 62 may be provided in an angle bracket 620 extending upward from one side of the base 60. Surrounding the central spindle 61 is a flanged sleeve 63. At the upper end of member 63 is mounted a driving pulley 64 driven from any suitable source of power (not shown) by means of a driving belt 65. Pulley 64 is preferably secured to sleeve 63 as shown by a threaded annular nut 66.

A radial ball bearing 67 is fitted at the upper end of the hub of pulley 64 in such manner that the pulley 64 and sleeve 63 are free to slide longitudinally thereon. The inner race of ball bearing 67 is restrained between a flange on sleeve 68 immediately surrounding spindle 61 and a threaded nut 69.

In the annular recess formed between the pulley 64 and the outwardly extending flanged portion of sleeve 63 is mounted a disc 70 which is provided with a ball thrust bearing 71 resting on the flange of member 63 as shown. Member 70 forms a support for the slotted loading weights 72. Stop pin 73 is screwed into one side of disc 70 and is arranged to bear against an upright post 74 attached to the base 60 of the machine in order to prevent rotation of disc 70 and loading weights 72 while sleeve 63 is in motion. This construction allows changing of contact loading values while the machine is in operation.

A circular member 75 is bolted to the lower face of the radial flange of member 63 by means of bolts 76 which are received into an upwardly extending flange 77 on member 75. Member 75 is free to turn with pulley 64 and sleeve 63 and is guided by a radial ball bearing 78 which is mounted on a flange of the central spindle 61. Member 75 is free to slide longitudinally on bearing 78 in the same manner as pulley 64 is free to slide longitudinally on bearing 67.

Member 75 is provided with three equidistant vertical bores 79 in each of which is mounted a radial ball bearing 80 and a combined radial and thrust ball bearing 81 at the upper and lower end respectively. Spindles 82 are supported by ball bearings 80 and 81 and are free to rotate therein.

At the upper end of spindles 82 are mounted spur gears 83 which are secured to the spindles by lock nuts 84. Gears 83 mesh with a single stationary gear 85 which surrounds the central stationary spindle 61 of the machine. Gear 85 may be clamped between sleeve 68 and ring 86, which latter rests upon the inner race of the lower ball bearing 78.

The lower end of each spindle 82 is provided with a square shoulder 87 and a downwardly extending tapered portion 88, which latter terminates in an accurately hardened and ground cup to receive a single ball bearing 89.

A cup-shaped member 90 surrounds spindle 82 and is provided with a square recess to receive the square shoulder 87 on spindle 82. Member 90 extends upwardly into a suitable annular recess 91 in member 75 and forms a receptacle for lubricant which may work downward from the ball bearings 67, 80 and 81, and which might contaminate the lubricant undergoing test.

Cup 90 is provided on its lower face with two or more downwardly extending pins 92 which are received in corresponding holes in friction button 93, which latter is similar to the friction buttons 42 of the previously described embodiment of this invention.

The lower friction member (or disc) 94 for this embodiment of the invention is supported in a cup-shaped member 95 which is in turn supported by a self-aligning ball thrust bearing 96 suitably mounted in base 60. The cup-shaped member 95 is provided with two or more pins 99 which are received into corresponding holes in friction member 94 to prevent it from turning.

An electric heating element 100 may be incorporated as shown into the body of member 95 for heating the lubricant and the friction surfaces. Flexible connections 101 may be brought out through a suitable hole in the base 60.

Member 95 is restrained from turning by a flat leaf spring 102 which bears against post 74, which latter is attached to base 60 as mentioned above. A suitable circular scale 103 may be provided on one side of member 95 as shown and an index or pointer 104 may be mounted upon base 60 to indicate the deflection of spring 102.

A thermocouple 105 may be used as described above for indicating the temperature of the lubricant between the tracks 97 and 98.

In operation, pulley 64, sleeve 63 and member 75 are rotated at a desired uniform speed by means of the belt 65 and any suitable source of power (not shown). As spindles 82 are carried by member 75 and as they are connected to the stationary gear 85 on the central spindle by means of spur gears 83, the rotation of member 75 will cause gears 83 and spindles 82 to rotate about their own axes as well as the central axis of the machine. This rotation will be transmitted to the friction buttons 93 by means of the pins 92 and will cause them to rotate about their own axes at the same time they are carried around over tracks 97 and 98 by the rotation of member 75 about the central axis of the machine. In this way the lapping action previously mentioned will be obtained. The frictional drag of buttons 93 on tracks 97 and 98 of friction member 94 will cause the latter to be urged around after the friction buttons. This drag will be resisted by spring 102 and the amount of the deflection of the spring caused by the drag will be indicated on scale 103 by index 104.

It will be seen from these two descriptions that there are various means by which the friction buttons or their equivalent may be caused to rotate about their own axes as well as the central axis of the machine, thus producing the lapping or smoothing action which has been found to be desirable in the operation of this testing device.

It will be seen from these descriptions that conditions simulating those in an internal combustion cylinder may be obtained. The friction buttons may be provided with sharp edges as found in piston rings and they may be pressed against relatively moving surfaces, namely, the tracks of the friction member, which correspond to the cylinder wall. It has been found with this apparatus that conventional lubricant testing procedures to determine the effect of loading, temperature variation, dilution, and the like, and which are so widely known that they need not be described here, disclose characteristics of lubricants which may be accurately reproduced and which may be determined by no other machine.

It will be also understood that considerable variation may be made in the form and arrangement of the friction buttons and the tracks on the grooved friction element upon which they rub. If the centers of the pivot pins and friction buttons are moved to a circle which lies outside the mean track circle G, the buttons will be rotated in a direction opposite to that indicated as the friction forces set-up will have moments opposite in direction. The load on the four contact surfaces of each button, however, will not be equally distributed and the friction test results will not be so consistent as with the relation preferred and described above.

It becomes evident that if the centers of the pivots and friction buttons are located on a circle of such radius that the moment arm relation of their pivots and areas of contact are balanced, no rotation of the buttons will take place in the case of the first embodiment described above. This would cause the tracks to wear grooves in the buttons, which would become roughened and consequently would not give a true indication of the oiliness of the lubricant. Intermittent operation, due to the measurement of static instead of kinetic friction, would result as explained above. It is obvious that this disadvantage would not exist with the form of apparatus shown on Figure 4.

If static friction determinations as found by the Deeley machine, mentioned above, are desired, they may be obtained by operating the type shown in Figure 1, in such a manner that the member 15 is caused to rotate very slowly, say one revolution in a minute. The buttons 42 will then seize onto the tracks 44 and 45 and be carried around with them until the force of the spring 48 overcomes the static friction between their contact surfaces. The maximum deflection of pointer 50 on scale 51 will be an indication of this friction.

From the foregoing description it becomes apparent that this device has a wide application in investigating lubricating properties. It will be seen that the apparatus may be used to measure either kinetic or static friction of absorbed films and kinetic friction of viscous fluid films, or combination of absorbed and fluid films.

Although specific constructions embodying this invention have been described and illustrated, it is to be understood that the invention is not limited to those devices, and all such modifications and changes as come within the scope of the appended claims are embraced thereby.

We claim:

1. A friction testing machine comprising a friction element, means for producing circular motion of said element, means for contacting said element with a plurality of friction buttons adapted to be rotated about their respective axes by the motion of said friction element, and means for indicating the frictional drag of said friction buttons upon said friction element.

2. A friction testing machine comprising a friction element, means for rotating said element, said element being provided with two annular tracks of unequal width, means for contacting a plurality of independently axially rotatable circular friction buttons on said tracks, means for supplying lubricant to said tracks and friction buttons, means for indicating the frictional drag of said friction buttons, and means for varying the contact pressure between said friction buttons and said tracks.

3. A friction testing machine as described in claim 2, in which the contact surfaces between said friction buttons and said friction tracks are of substantially equal area and are equally loaded.

4. A friction testing machine comprising a friction element, means for rotating said element, said element being provided with annular tracks, means for contacting a plurality of independently axially rotatable circular friction buttons on said tracks, means for supplying lubricant to said tracks and friction buttons, means for indicating the frictional drag of said friction buttons on said tracks, and means for varying the contact pressure between said friction buttons and said tracks.

5. In an oiliness testing machine, a plurality of friction buttons, a friction member provided with a grooved surface contacting with and opposed to said buttons, said member being rotatable with respect to said buttons, the relation between said buttons and said friction member being such that rotation of the friction buttons about their centers is caused by the rotation of said friction member about its axis.

6. A friction testing machine comprising a friction element, a plurality of opposed rotatable friction buttons, said buttons being shaped so as to contact with said friction element only adjacent their outer edges, means for producing relative sliding movement between said element and said buttons, and means for indicating the relative frictional drag between said buttons and said element.

7. A friction testing machine comprising a friction element, means for rotating said element, a plurality of rotatable friction buttons in contact with said element, means for supplying lubricant to said friction element and friction buttons, said element and said buttons being so shaped that contact will occur at a plurality of points on the faces of said buttons, means for indicating the frictional drag between said buttons and said elements, means for varying the contact pressure between said buttons and said element and means for varying the temperature of said lubricant and said friction element.

8. In a device for testing the frictional resistance of a lubricant, a cup adapted to contain lubricant, a bearing for said cup, annular tracks in said cup adapted to be wetted by said lubricant, circular friction buttons with downwardly depending annular flanges adapted to engage said tracks, means for rotating said friction buttons about their axes, means for applying pressure to urge said buttons against said tracks and means for measuring the frictional resistance between said cup and said friction buttons.

9. In an apparatus of the type described, an annular track adapted to be lubricated and rotated about its axis, a plurality of pivoted friction buttons in pressure-adjustable contact with said track and arranged to be rotated about their pivots by their frictional drag on said track, a pivoted spider free to move vertically and resting upon said buttons, spring restraining means adapted to oppose rotation of said spider, a fixed scale, and an indicator attached to said spider and adapted to show on said scale the deflection of said spring caused by the frictional drag of said buttons on said moving track.

10. A friction testing machine comprising a rotatable friction element, two concentric tracks on said element, a plurality of rotatable friction buttons axially parallel with said element, said buttons contacting said tracks only over small areas adjacent their outer edges, means for producing relative movement between said element and said buttons, and means for indicating the friction force between said buttons and said element.

11. A friction testing machine comprising a friction element, two parallel contact faces on said element, a rotatable friction button contacting said faces only over small areas remote from its axis, means for producing a relative sliding movement between said friction element and said button, and means for indicating the friction force between said element and said button due to said movement.

12. In a friction testing machine, a friction element, a plurality of rotatable friction buttons in contact with said element, said element and said buttons being shaped so that contact will occur at a plurality of points on the faces of said buttons, means for producing relative sliding movement between said buttons and said element, and means for indicating the frictional drag between said buttons and said element.

13. In a friction testing machine, a friction element, a rotatable friction element in contact with said first named element, said elements being shaped so that contact will occur at a plurality of points on the face of said second named element, means for relatively moving said elements so that contact between the same pair of points on said elements is substantially non-recurrent, and means for indicating the relative frictional drag between said elements.

GEORGE L. NEELY.
ELDRED E. EDWARDS.